United States Patent [19]
Yanagawa et al.

[11] Patent Number: 5,084,850
[45] Date of Patent: Jan. 28, 1992

[54] APPARATUS FOR DETECTING FOCUS ERROR SIGNAL

[75] Inventors: Naoharu Yanagawa; Katsuharu Satoh, both of Tokorozawa, Japan

[73] Assignee: Pioneer Electronic Corporation, Tokyo, Japan

[21] Appl. No.: 487,077

[22] Filed: Mar. 1, 1990

[30] Foreign Application Priority Data

Mar. 3, 1989 [JP] Japan ............................ 1-49941

[51] Int. Cl.⁵ ............................................ G11B 7/00
[52] U.S. Cl. .......................... 369/44.41; 369/44.23; 369/124
[58] Field of Search ................. 369/112, 44.23, 44.14, 369/44.41, 120, 122, 110, 44.32, 124, 44.42; 250/205.1, 205.4; 750/201.5

[56] References Cited

U.S. PATENT DOCUMENTS

| | | | |
|---|---|---|---|
| 4,123,652 | 10/1978 | Bouwhuis | 369/112 |
| 4,546,463 | 10/1985 | Opheij et al. | 369/120 |
| 4,695,158 | 9/1987 | Kotaka et al. | 369/44.23 |
| 4,748,610 | 5/1988 | Nakata et al. | 369/44.32 |

FOREIGN PATENT DOCUMENTS

| | | | |
|---|---|---|---|
| 0146452 | 8/1984 | Japan | 369/44.41 |
| 0053739 | 3/1988 | Japan | 369/44.23 |
| 0256028 | 10/1989 | Japan | 369/44.41 |

OTHER PUBLICATIONS

Electronic Component and Application 6(1984), 4, 209-14.

Primary Examiner—Roy N. Envall, Jr.
Assistant Examiner—Thang V. Tran
Attorney, Agent, or Firm—Sughrue, Mion, Zinn, Macpeak & Seas

[57] ABSTRACT

An apparatus for detecting a focus error signal in which reflected laser light is split into two optical paths by a polarized light beam splitter while astigmatisms are produced in the laser light by at least one astigmatism generating element, and the two split beams are led so as to be incident upon two quadrant photodetectors, respectively. A focus error signal is obtained as an electrical signal by subtracting the sum of the quantities of light received by one of the diagonal pairs of regions among the quadrant regions of the two photodetectors from the sum of the quantities of light received by the other diagonal pair. An offset component in a focus error signal is removed by, for example, a variable resistor. This arrangement enables cancelling of influence of double refraction in a magnetooptic disk or the like, thereby making the optical head free of the problem of such influence.

11 Claims, 6 Drawing Sheets

FIG. 3
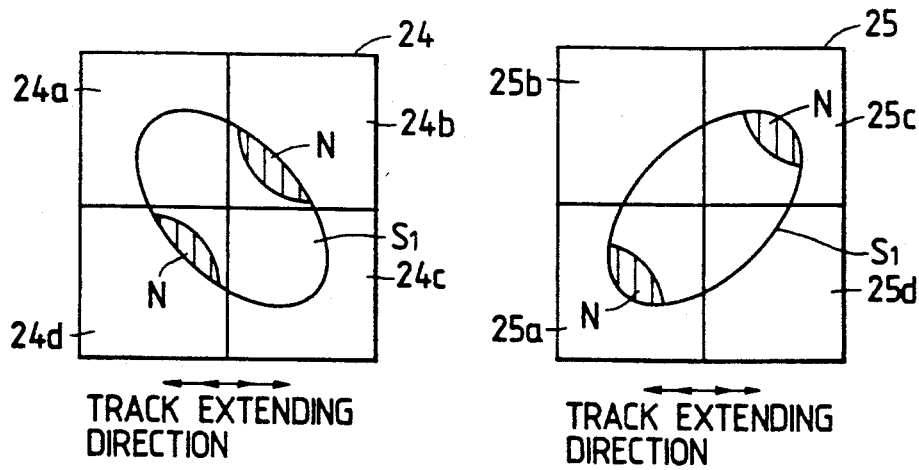
(a) CASE THAT AN OBJECTIVE LENS IS TOO CLOSE TO A DISK
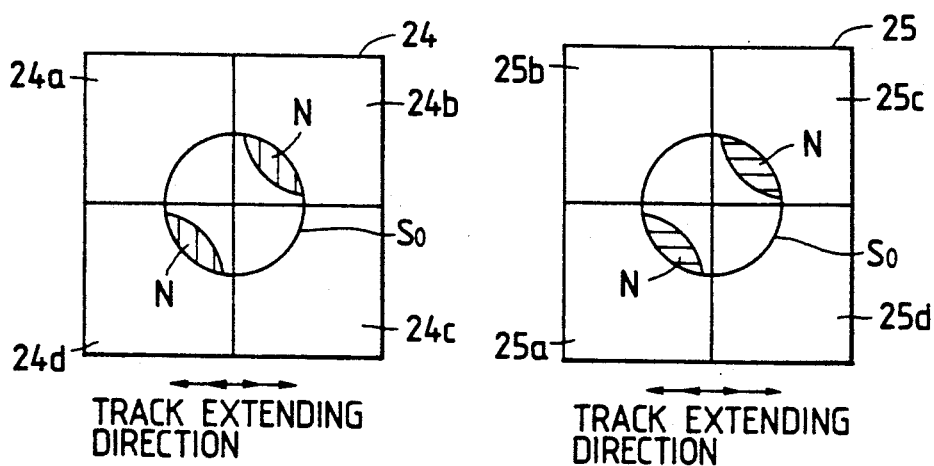
(b) CASE THAT A FOCAL POINT IS FORMED ON THE DISK
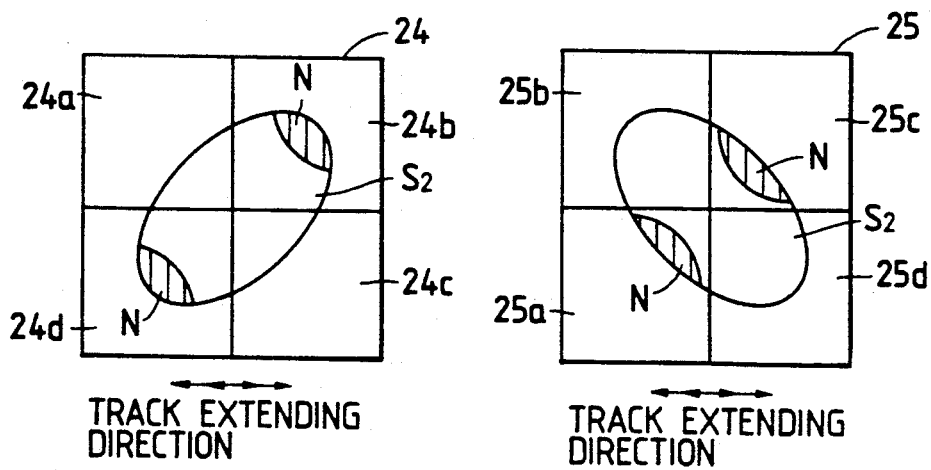
(c) CASE THAT THE OBJECTIVE LENS IS TOO FAR FROM THE DISK

APPARATUS FOR DETECTING FOCUS ERROR SIGNAL

BACKGROUND OF THE INVENTION

1. Field of the Invention

This invention relates to an apparatus for detecting a focus error signal for recording, reproducing or erasing information by means of a laser beam and, more particularly, to a focusing servo device for controlling a spot of a laser beam by adjusting a position of an objective lens by means of the reflected laser beam from a magnetooptical disk (referred to as MO disk hereunder).

2. Related Art

As optical recording mediums, a laser video disk (LVD), a digital audio disk (DAD), a compact disk read only memory (CD-ROM) and an MO disk memory are conventionally known. An optical head is used for reading information from these disks and writing information onto these disks. The optical head emits a laser beam to read information recorded on a disk and write information onto the disk. The laser beam must be emitted accurately onto the information recording surface of the disk. To this end, the optical head is usually controlled by a focusing servo device and a tracking servo device.

A conventional focusing servo device converts a beam reflected by the information recording surface of the disk into electric signals and controls an actuator for focusing operation so that focus error signals among the electric signals become naught. As a method of the focusing servo operation, a method utilizing astigmatism is known. A focusing servo device which adopts this method comprises a cylindrical lens for generating astigmatism and a quadrant type photodetector having four light receiving regions. The cylindrical lens generates two elliptic light spots on an optical path. The quadrant photodetector is disposed in such a manner that its light receiving surface divided into four regions or sections is located at a predetermined position where a truly circular light spot of the laser beam is reflected on the light receiving surface when the laser beam is focused correctly on the disk. If the focal point is deviated forward or backward from the predetermined position, an elliptic light spot is formed on an optical path. The quadrant photodetector is disposed in such manner that in case that the focal point of a laser beam is deviated from a pit of the disk along its optical axis, an elliptic light spot is formed in the direction of a diagonal line passing through the first and third quadrant regions or the second and fourth quadrant regions. An electric output corresponding to a difference in quantity of received light between two regions forming one diagonal pair and two regions forming the other diagonal pair is outputted. In this case, if the difference in quantity of received light is not zero, the focal point does not coincide with the recording surface of the disk. A focusing servo control is performed so that the difference in quantity of received light becomes naught.

The accuracy of the focusing servo control has a connection with the optical property of material of a substrate with which the recording surface of the disk is covered. As a material of a disk substrate, glass or polymethyl methacrylate resin (PMMA) is often used in view of its optical property such as transparency. However, in view of cost and mass-production, it is considered that polycarbonate resin is used because polycarbonate is more low-priced than PMMA resin. Polycarbonate resin has a high double refractive index as an optical property. If the material of a disk substrate has a high double refractive index, the material has the following bad effect upon the focusing servo control in the recording or reproduction magnetooptically. That is, a laser beam is converged in the shape of a cone while passing through the substrate of the disk. At this time, rays near its optical axis enter perpendicularly the recording surface of the disk, and, however, rays at an outer periphery of bundle of rays enter there with a large angle of incidence. In this case, if polycarbonate resin having a high double refractive index is used for a substrate with which the recording surface of the disk is covered, the rays at outer periphery are double-refracted between a point of incidence and a reflection point. This double reflection or the birefringence is an optical phenomenon that two refracted ray appear when the light enters the anisotrophic medium such as the crystal. This birefringence causes a phenomenon that the phase of the rays at the periphery of the bundle of rays is delayed in comparison with rays near the center portion of its optical axis. This phenomenon is called "retardation". As a result, rays at a periphery of bundle of rays are elliptically polarized. There appear some uneven parts each having a high intensity of light at a periphery of a light spot formed on the light receiving surface of the photodetector due to the elliptic polarization of light and the use of the polarization beam splitter (referred to as PBS hereunder) in the magnetooptical head. If there appear a few of high intensity parts at two divided regions (e.g. two regions of the first and third quadrants), this causes a state wherein there is a difference in quantity of received light between two diagonal pairs of regions of the photodetector in spite of a good focusing. With this state, the focal point of an objective lens is moved needlessly, and focusing servo control does not operate in case of need.

SUMMARY OF THE INVENTION

It is an object of the present invention to provide an apparatus for detecting a focus error signal which a focus control can be effected without influence by double refraction on the basis of the property of a substrate material of a disk.

To achieve this object, according to the preferred aspect of the present invention, there is provided an apparatus for detecting a focus error signal for effecting recording/reproduction of information by irradiating a recording medium with laser light, said apparatus for detecting a focus error signal comprising: a light irradiation means for irradiating the recording medium with laser light; a converging means for converging laser light reflected by the recording medium and introduced out of said light irradiation means; a polarized light beam splitter for splitting laser light reflected by the recording medium and introduced out of said light irradiation means into different optical paths according to the planes of polarization; first and second quadrant photodetectors with four light receiving regions respectively disposed in the optical paths split by said polarized light beam splitter; an astigmatism generating means for generating astigmatisms in the light led to said first and second quadrant photodetectors; an operation means for obtaining a differential output between sum output from one pair of said regions where an intensity of received light is increased and a sum output from the other pair of said regions with respect to one astigmatism, said differential output from each quadrant photodetector forming a focus error signal.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 3 including (a)-(c), is a view showing a state of light spots formed on the light receiving surface of a first quadrant photodetector;

DESCRIPTION OF THE PREFERRED EMBODIMENT

Figure 1:
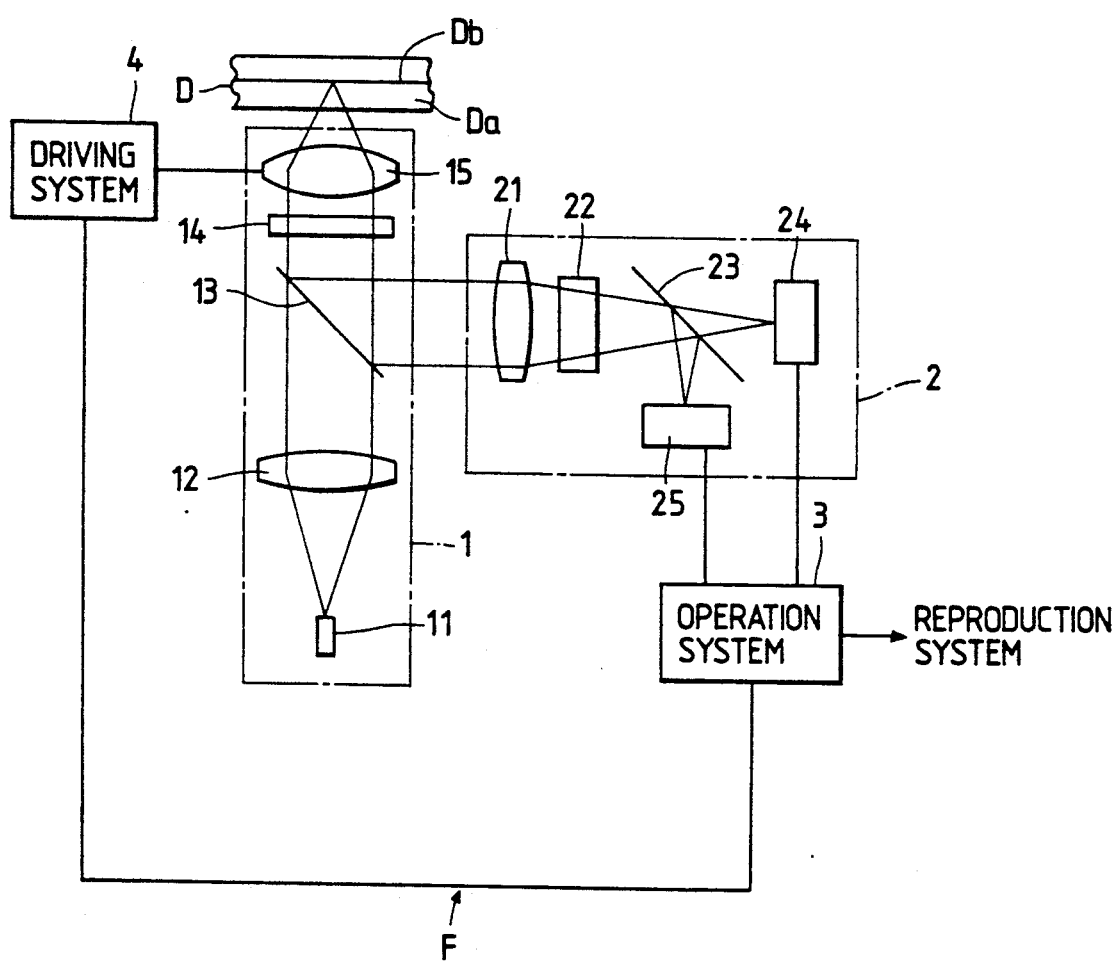
FIG. 1 is a view showing an embodiment of an apparatus for detecting a focus error signal according to this invention.

FIG. 1 is a schematic view showing an embodiment of a focusing servo device F according to this invention.

The focusing servo device F comprises a light irradiation system 1 for irradiating the recording surface Db of an MO disk D with a laser beam so as to form a spot (referred to as an information reading light spot hereunder) on the recording surface Db, which includes a first PBS 13, a detection system 2 for converting reflected light from the MO disk D into electric signals, an operation system 3 for picking up a focus error signal for a focusing servo control and tracking error signal for tracking servo control from electric signals transmitted from the detection system 2, a driving system 4 for adjusting a position and an inclination of an objective lens in response to the focus error signal and the tracking error signal.

Light Irradiation System

First, the construction of the light irradiation system 1 will now be explained.

The light irradiation system 1 has a semiconductor laser 11 as a laser light source. A collimator lens 12 is provided in the optical path of laser light emitted from the semiconductor laser. The collimator lens 12 converts diffused light into a bundle of parallel rays. An objective lens 15 is provided opposite to the MO disk D. The objective lens 15 converges the bundle of parallel rays to focus it on the recording surface Db of the MO disk D. The first PBS 13 is disposed in the optical path between the collimator lens 12 and the objective lens 15. The PBS has a function to separate rays having a specific plane of polarization from the bundle of rays at a certain separation rate. In the optical path between the first PBS 13 and the objective lens 15 is provided quarter-wave phase shift generating means 14 such as a quarter-wave plate for shifting the phase of the laser beam by a quarter-wave length.

The light irradiation system 1 will now be explained.

The semiconductor laser 11 emits laser light linearly polarized. The emitted laser light is diffused light which is converted by the collimeter lens 12 into a bundle of parallel rays. The bundle of parallel rays passes through the first PBS 13. After this, the quater-wave plate 14 generates a difference of optical path of a quater-wave length between two linearly polarized lights whose planes of polarization are disposed perpendicular to each other. The objective lens 15 converges the laser beam of bundle of parallel rays to form a light spot for reading information from the MO disk D on the recording surface Db of the MO disk D.

The information reading spot light is reflected by the recording surface of the MO disk D. The objective lens 15 converts the laser light having been reflected and returned therefrom into a bundle of parallel rays which then passes through the quarter-wave plate 14 again. Therefore, at this time, there is a difference of optical path, corresponding to a half-wave length between two linearly polarized lights of the reflected laser light, whose planes of polarization are disposed perpendicular to each other. That is, at this time, the plane of polarization of the reflected laser light is rotated by 90 degrees from the plane of polarization at the time of incidence. The reflected light enters the first PBS 13 again and is directed toward other optical path to lead it to the detection system 2 by the first PBS 13 because of its different plane of polarization.

Detection System

The detection system 2 has a detecting lens 21 for converging the reflected laser light. In the optical path between the detecting lens 21 and its focal point is provided an astigmatism generating means for obtaining, in case that the focus of laser light does not coincide with the recording surface, two elliptic light spots, of which directions of the major axis are coincident with each other, in its light path from the reflected light which has passed through the astigmatism generating means 22 such as a cylindrical lens, a slanted plane-parallel plate or a deformed prism. In the optical path between the detecting lens 21 and two elliptic light spots is provided a second PBS 23 which is disposed obliquely at an angle of 45 degrees with respect to the linearly polarized light of the reflected light to divide equally bundle of rays of the reflected light into a first detecting light path as the P wave and a second detecting light path as the S wave. Instead of this, the whole detecting system 2 may be slanted at an angle of 45 degrees with respect to the linearly polarized light of the reflected light. Further, the optical axis of a half-wave plate may be disposed obliquely at an angle of 22.5 degrees with respect to the incident surface of the first PBS 13 between the detecting system 2 and the first PBS 13.

A first quadrant photodetector 24 is disposed in a predetermined position where a cross section of bundle of rays forms an exact circle on its light receiving surface when the laser beam is focused correctly. A second quadrant photodetector 25 is disposed in a mirror image position, i.e. the symmetry position with respect to the reflection plane of the PBS 23, in the second detecting light path, where the reflected light by the second PBS 23 forms a mirror image.

Next, the operation of the detection system 2 will now be explained.

The bundle of parallel rays reflected by the MO disk D is converged by the detecting lens 21 and passes through the astigmatism generating means 22. The second PBS 23 permits a half part of the reflected light having been converged to pass through itself to provide a first detecting optical path because of difference of planes of polarization of the reflected light while the remaining half part thereof is reflected by the PBS 23 to provide a second detecting optical path. If the distance between the objective lens 15 and the recording surface of the MO disk D is not changed, that is, the laser beam is focused exactly on the recording surface Db, the reflected light forms two truly circular light spots on the light receiving surfaces of the first and second optical detectors, respectively. However, if the distance therebetween is changed by some reason to cause the focal point of the laser light to be deviated from the recording surface Db of the MO disk D, two elliptic light spots, of which directions of the major axis are coincident with each other, are respectively formed on the light receiving surfaces of the first and second quadrant photodetectors 24, 25 under the influence of the astigmatism.

Figure 2:
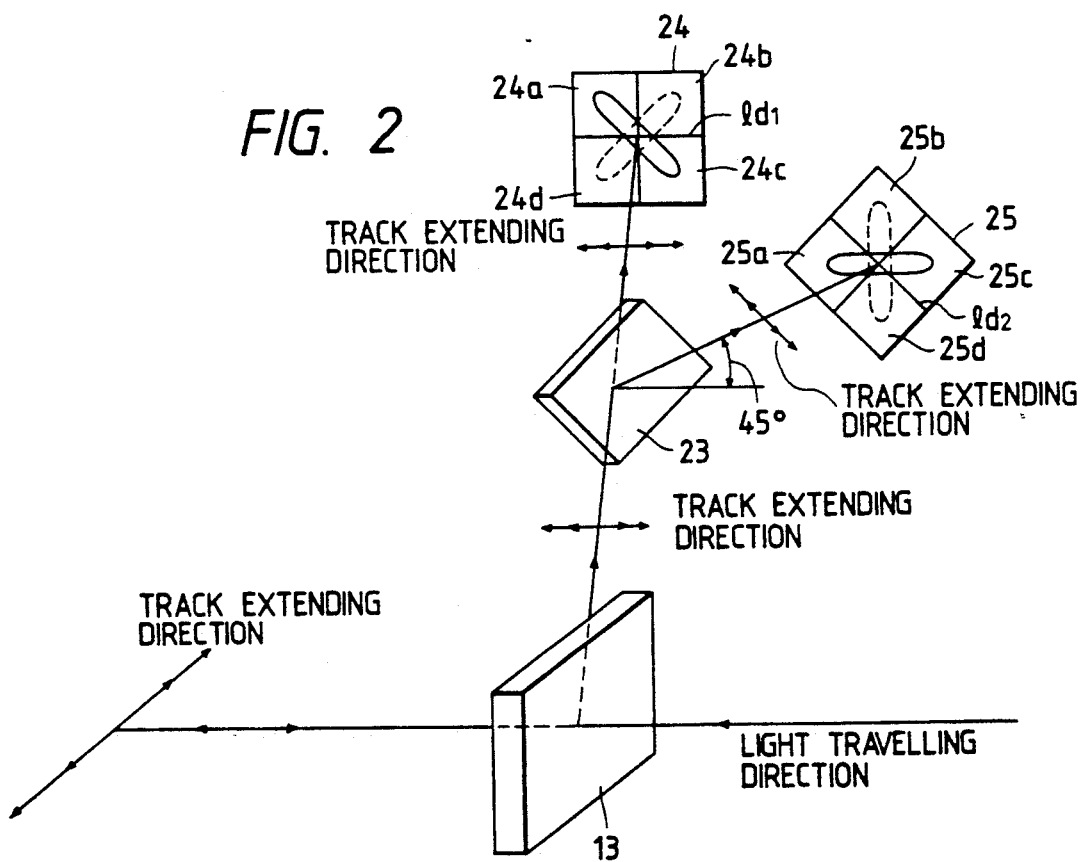
FIG. 2 is a schematic view showing a positional relationship between some elements of an optical system in an embodiment of an apparatus for detecting a focus error signal according to this invention.

FIG. 2 is a view showing a positional relationship between the light receiving surfaces of the first and second PBS 13, 23 and the first and second quadrant photodetectors 24, 25. As shown in FIG. 2, a dividing line $ld_1$ of the light receiving surface of the quadrant photodetector 24 and a dividing line $ld_2$ of the light receiving surface of the quadrant photodetector 25 coincide optically with the track extending direction of the MO disk D.

When the focal point of the laser light is deviated from the recording surface Db of the MO disk D, a light spot having a deformed elliptic shape whose apse line coincides with a diagonal line passing through two regions or quadrants disposed diagonally on the light receiving surface of each of quadrant photodetectors 24, 25. That is, a light spot whose major axis extends diagonally in the second and fourth quadrants 24a, 24c is formed on the light receiving surface of the first quadrant photodetector 24 while a light spot whose major axis extends diagonally in the first and third quadrants 25a, 25c. Therefore, the direction of the major axis of the first quadrant photodetector 24 is coincident with that of the second quadrant photodetector 25. That is, the major axis of the deformed ellipse formed on the first photodetector 24 is perpendicular to the apse line of the deformed ellipse formed on the second photodetector 25.

FIG. 3 shows states of light spots formed on the light receiving surfaces of the first and second quadrant photodetectors 24, 25, respectively.

FIG. 3(a) shows a state wherein the objective lens 15 is located too close to the MO disk D. FIG. 3(b) shows a state wherein the focal point of the laser light coincides with the recording surface Db of the MO disk D. FIG. 3(c) shows a state wherein the objective lens 15 is located too far from the recording surface Db of the MO disk D. As shown in FIG. 3b, if the focal point is on the recording surface Db of the MO disk D, a light spot $S_0$ is formed on the light receiving surface of each of two photodetectors 24, 25. If the focal point is deviated from the recording surface of the MO disk D, for example, the objective lens 15 is located too close to the disk D, an elliptic light spot $S_1$ is formed on the light receiving surface of each of quadrant light detectors 24, 25. If the objective lens 15 is located too far from the MO disk D, an elliptic light spot $S_2$ whose major axis is perpendicular to that of the elliptic light spot $S_1$ is formed on the light receiving surface of each of quadrant light detectors 24, 25. If the astigmatism generating means 22 is disposed so as to change its angle with respect to the optical axis, the disposition of the light spots $S_1$, $S_2$ can be reversed to the state shown in FIG. 3.

That is, in this case, if the objective lens 15 is located too close to the MO disk D, an elliptic light spot is formed in the same manner as that of the light spot $S_2$ on the light receiving surface of each of detectors 24, 25. However, if the objective lens 15 is located too far from the MO disk D, it is possible that an elliptic light spot such as the elliptic light spot $S_1$ is formed thereon.

Figure 4:
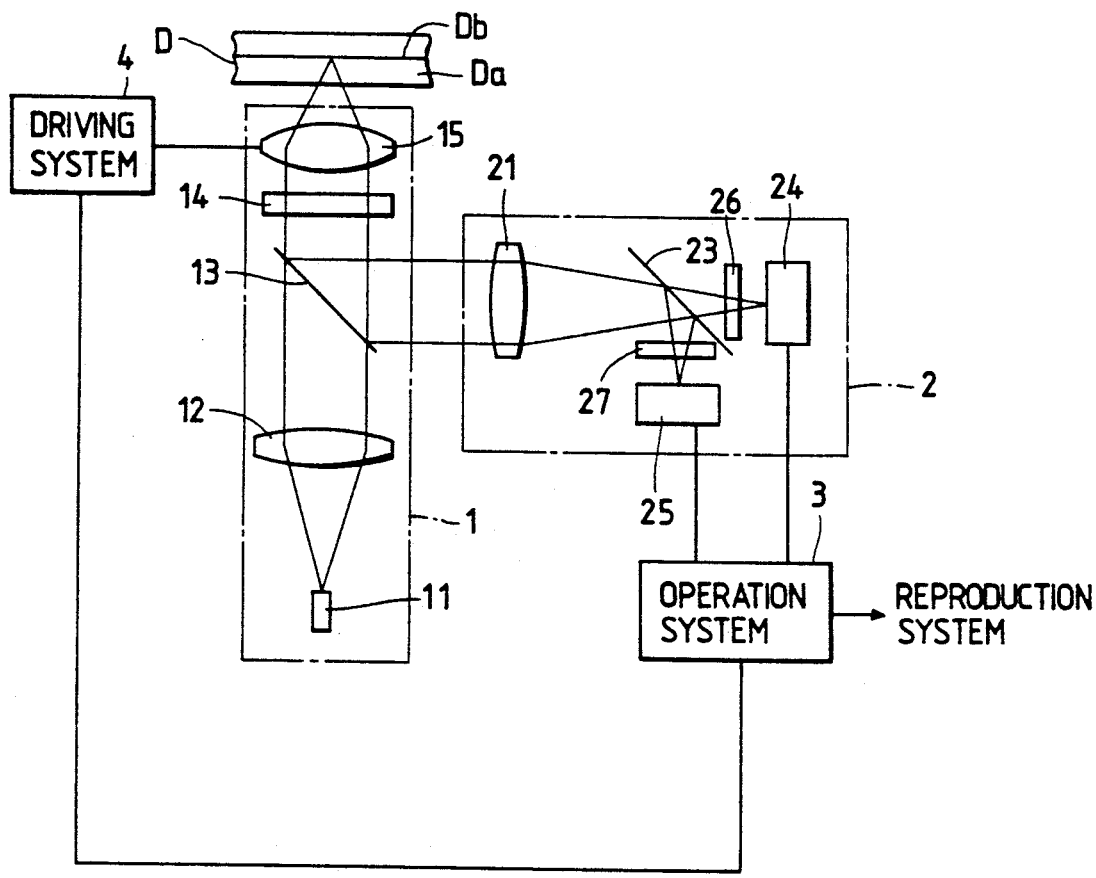
FIG. 4 is a view showing a construction of an apparatus for detecting a focus error signal of another embodiment according to this invention.

Instead of the astigmatism generating means 22, two astigmatism generating means 26, 27 may be, as shown in FIG. 4, disposed symmetrically with respect to the PBS 23 midway of the first and second detection optical paths, respectively.

If a material having a property of large double refraction such as polycarbonate resin is used for the substrate of the MO disk D, then two uneven portions N, N each having a high intensity of light in comparison with other remaining regions results as shown in FIG. 3.

The reason for this phenomenon will be explained.

Laser light is converged to the surface of the MO disk D in the shape of a cone. Therefore, the rays enters perpendicular to the substrate at a center portion of the bundle of rays while the rays enters the substrate at a periphery of the bundle of rays with a relatively large incident angle. Accordingly, the rays at the periphery of the bundle of rays are influenced by retardation (delay of phase) to cause the rays at the periphery of the bundle of rays to be elliptically polarized as shown in FIG. 5.

Figure 5:
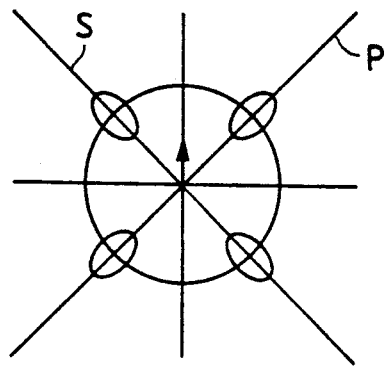
FIG. 5 is a schematic view showing an elliptic polarization at a periphery of bundle of rays.
Figure 6:
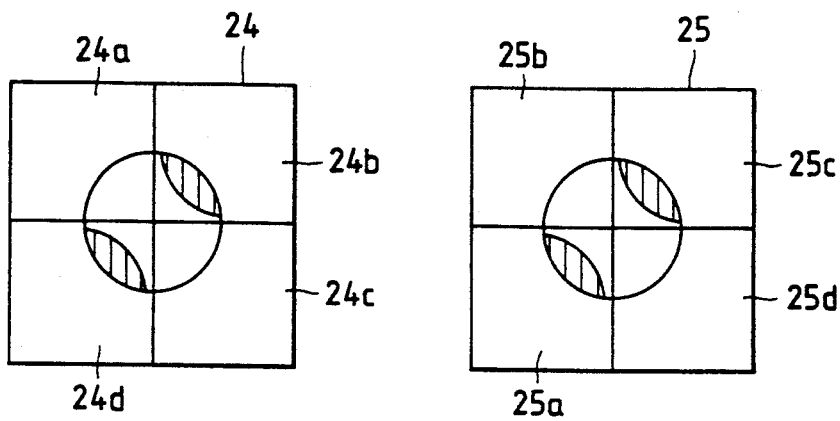
FIG. 6 is a view showing an unevenness of distribution of intensity of light on the light receiving surface of the quadrant photodetector.

In FIG. 5, the direction of linear polarization which is not rotated by magnetization on the recording surface at the time of recording information is indicated by an arrow, and two intensities of p-polarized light and s-polarized light correspond to two components in the directions of a line P and a line S in elliptic polarization and linear polarization, respectively. As mentioned above, since the PBS 23 splits a ray into a p-polarized light and an s-polarized light, distribution of intensity on the light receiving surface of photodetector 24, becomes uneven due to the component of the elliptic polarization thereby to generate two hatched portions in a pair of the first and the third quadrants 24b, 24d disposed in one diagonal direction. While distribution of intensity on the light receiving surface of photodetector 25 becomes uneven due to the component of the elliptic polarization thereby to generate two hatched portions is a pair of the second and the fourth quadrants 25a, 25c disposed in one diagonal direction. Each of the four hatched portions has a larger amount of received light. Therefore, each of the pairs of quadrants 24b, 24d, 25a, 25c in the light receiving surfaces has a larger amount of light than that of each of the other pairs of quadrants 24a, 24c, 25b or 25d as shown in FIG. 6. For this reason, even if the focal point of the objective lens 15 is located just on the recording surface Db of the MO disk D, the amount of the received light of the regions 24b, 24d, 25a or 25c is larger than that of the regions 24a, 24c, 25b or 25d. Therefore, the focusing servo control is unnecessarily performed. In contrast, even if the amount of received light of the diagonal regions 24a, 24c, 25b or 25d is larger than that of the other diagonal regions 24b, 24d, 25a or 25c, that is, even if the focusing servo control is necessary, the focusing servo operation is not carried out.

Operation System

Figure 7:
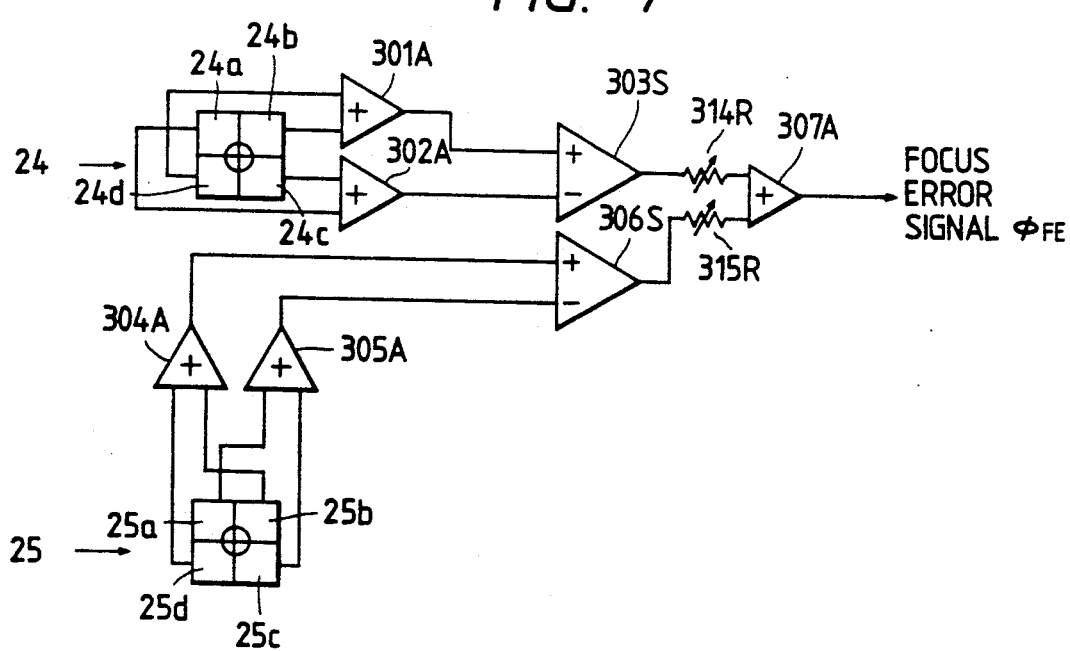
FIG. 7 is a view showing an embodiment of operation system of an apparatus for detecting a focus error signal according to this invention.

FIG. 7 shows a circuit of an operation system 3. The operation system 3 is electrically connected to the first and second quadrant photodetectors 24, 25. The operation system 3 comprises, as shown in FIG. 7, an addition circuit 301A as a first addition means or a fourth addition means, an addition circuit 302A as a second addition means or a sixth addition means, a subtraction circuit 303S as a first subtraction means or a second subtraction means, an addition circuit 304A as a first addition means or a fifth addition means, an addition circuit 305A as a second addition means or an seventh addition means, a substraction circuit 306S as a first subtraction means or a third subtraction means and an addition circuit 307A as a third addition means.

The input terminals of the addition circuit 301A are connected to the two light receiving surfaces 24b, 24d of the first quadrant photodetector 24, disposed in one diagonal direction, respectively. The terminals of the addition circuit 302A are connected to the two light receiving circuit 24a, 24c of the first photodetector 24, in the other diagonal direction. The plus input terminal of the subtraction circuit 303S is connected to the output terminal of the addition circuit 301A while the minus input terminal of the substraction circuit 303S is connected to the output terminal of the addition circuit 302A.

The input terminals of the addition circuit 304A are connected to the two light receiving surfaces 25b, 25d of the second quadrant light detector 25, disposed in one diagonal direction, respectively. The input terminals of the addition circuit 305A are connected to the two light receiving surfaces 25a, 24c of the second light detector 25, disposed in the other diagonal direction, respectively. The plus input terminal of the subtraction circuit 306S is connected to the output terminal of the addition circuit 304A while the minus input terminal of the subtraction circuit 306S is connected to the output terminal of the addition circuit 305A. Further, the input terminals of the subtraction circuit 307A are connected to the output terminal of the subtraction circuit 303S and the output terminal of the subtraction circuit 306S, respectively.

The operation of this circuit system will now be explained.

The addition circuit 301A calculates the total amount of light received by the light receiving surfaces 24b, 24d disposed in one diagonal direction to output a first signal. The addition circuit 302A calculates the total amount of light received by the light receiving surfaces 24a, 24c in the other diagonal direction to output a second signal. The subtraction circuit 303S substracts the second signal from the first signal to output a third signal.

The addition circuit 304A calculates the total amount of light received by the light receiving surfaces 25b, 25d of the second photodetector 25, disposed in one diagonal direction to output a fourth signal while the addition circuit 305A calculates the total amount of light received by the light receiving surfaces 25a, 25c thereof disposed in the other diagonal direction to output a fifth signal. The subtraction circuit 306 subtracts the fifth signal from the fourth signal to output a sixth signal. Thereafter, the addition circuit 307A adds together the third and sixth signals to output a focus error signal $\phi$FE.

If the focal point is on the recording surface Db, a truly circular light spot is formed on each light receiving surface and an amount of light received by each of four divided light receiving regions 24a, 24b, 24c, 24d is equal to each other. The second photodetector 25 has the state as that of the first photodetector 24. Therefore, at this time, the focus error signal becomes zero. In case that the objective lens 15 is too close to the MO disk D, the focus error signal becomes a minus value. In case that the objective lens 15 is too far from the MO disk D, the focus error signal becomes a plus value, In this case, a pair of portions each having an uneven distribution of intensity of light, of the first photodetector 24 and a pair of portions each having an uneven distribution of intensity of light, of the second photodetector 25 are cancelled by each other thereby to eliminate the influence by double refraction of the substrate of the disk.

The characteristic feature of this invention resides in that the two quadrant type photodetectors are disposed symmetrically with respect to the PBS 23 and the influence of double refraction is cancelled by an operation process. In the embodiment as shown in FIG. 7, two quadrant photodetectors are exclusively used as photodetectors for the focusing servo operation.

Figure 8:
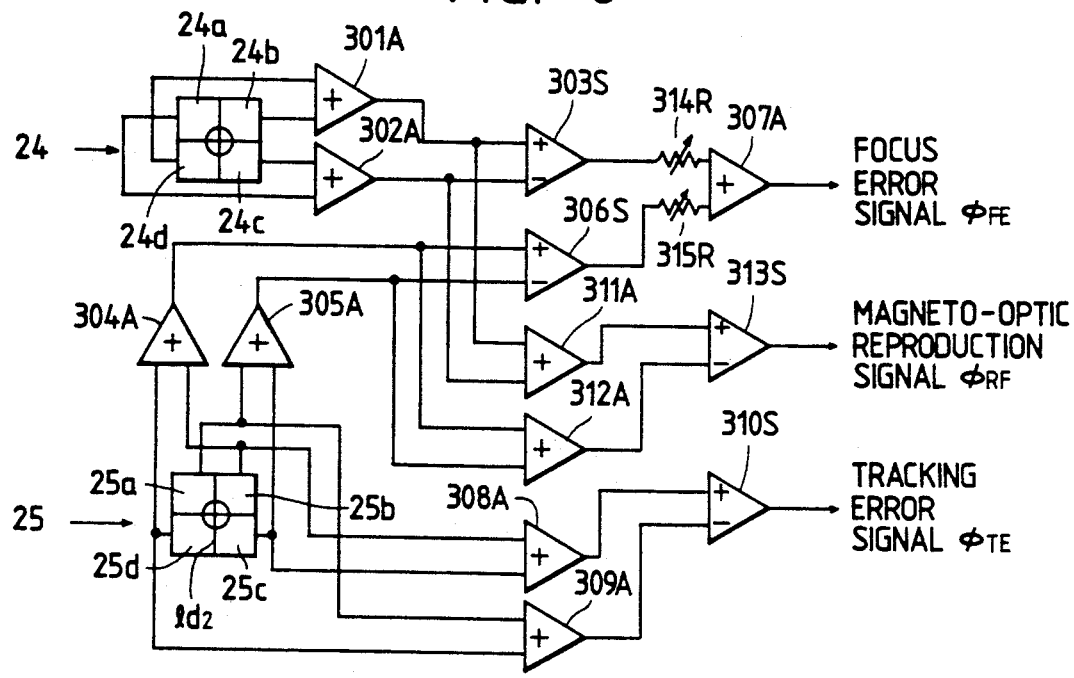
FIG. 8 and 9 are two views of circuits showing an operation system of an optical head according to this invention, respectively.

However, in order to increase efficiency of the above systems, one of quadrant photodetectors may be utilized for picking up a tracking error signal $\phi$TE and a magneto-optic reproduction signal $\phi$RF as shown in FIG. 8. That is, an addition circuit 308A calculates a total amount of light received by the two adjacent light receiving regions 25b, 25c of the second photodetector 25. An addition circuit 309A calculates a total amount of light received by the other two adjacent light receiving regions 25a, 25d of the second light detector 25. A subtraction circuit 310S subtracts the output of the addition circuit 309A from the output of the addition circuit 308A to output a tracking error signal $\phi$TE. In this case, the track of the MO disk D extends along the dividing line ld2 for dividing the light receiving surface of the second photodetector 25 into a pair of the light receiving regions 25b, 25c and a pair of the light receiving regions 25a, 25d. Therefore, when an incident beam is just on a recording track of the MO disk D, a light spot on the light receiving surface of the second photodetector 25 is divided into two equal semicircles by the dividing line ld2. When the incident beam is deviated from the track, the light spot is deviated from the dividing line ld2 in either side. When the focal point of the incident beam is just on the MO disk D and the light spot is just on the track, the tracking error signal becomes zero. When the light spot is deviated from the track, the tracking error signal becomes a plus or a minus value. In this case, since non-uniformity of the distribution of intensity of light on each light receiving surface is cancelled each other, the tracking error signal $\phi$TE is not influenced by the double refraction of the substrate. As described above, since two focus error signals, outputted from two photodetectors 24 and 25, are added each other, the output of focus error signal is twice as high as that of previous type so as to cause the focus servo control stable even if the magnetooptic reproduction signal is very faint.

An addition circuit 311A adds together the outputs of the addition circuits 301A, 302A. Further, a subtraction circuit 313S subtracts the output of an addition circuit 312A from the output of an addition circuit 311A to output a magneto-optic reproduction signal $\phi$RF.

Figure 9:
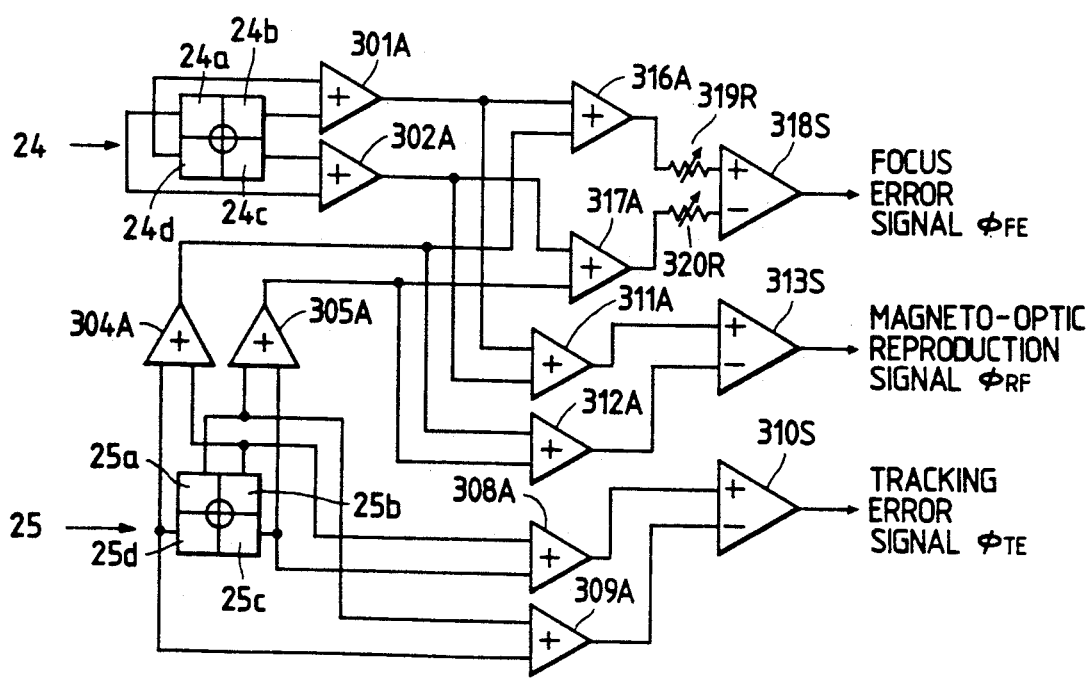

The operation system 3 may be assembled as shown in FIG. 9. That is, when a focus error signal is calculated, an addition circuit 316A as a third addition means or an eighth addition means adds together the first signal as the output of the addition circuit 301A as the first addition means or the fourth addition means and the fourth signal as the output of the addition circuit 304A as the first addition means or the fifth addition means to output an eighth signal. In addition, an addition circuit 317A as a third addition means or a ninth addition means adds together the second signal as the output of the addition circuit 302A as the second addition means or the sixth addition means and the fifth signal as the output of the addition circuit 305A as the second addition means or the seventh addition means to output a ninth signal. Further, a subtraction circuit 318S as a first subtraction means subtracts the ninth signal from the eighth signal to output a focus error signal $\phi$FE.

In a case where the detection system 2 is shifted from the position at 45° to linearly polarized light, or in a case where there is certain non-uniformity of polarization film (substrate) characteristics or unevenness of the distribution of the sensitivity of each light receiving element, the outputs from the respective light receiving regions may be unbalanced, resulting in occurrence of an offset component in a focus error. For this reason, at least one of variable resistor means 314R, 315R, 319R or 320R as shown in FIGS. 7 to 9 may be provided to remove such an offset component at the time of calculation of the outputs from the respective light receiving regions.

Driving System

The driving system 4 has a driving means such as an actuator provided with a coil for changing the position, direction and angle of the objective lens and is electrically to the operation system 3.

The focus error signal $\phi$FE and the tracking error signal $\phi$TE are transmitted to the driving system 4. The driving system 4 receives the focus error signal $\phi$FE and the tracking error signal $\phi$TE, and if each signal is not zero, the actuator is controlled so that each signal becomes zero by moving the position and angle of the objective lens 14 in order to adjust the distance between the objective lens 15 and the MO disk D and the position of the light spot for reading information with respect to the track of the MO disk D.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for detecting a focus error signal for effecting recording/reproduction of information by irradiating a recording medium with laser light, said apparatus comprising:

light irradiation means for irradiating the recording medium with laser light;

converging means for converging irradiated laser light which has been reflected by the recording medium;

a polarized light beam splitter for splitting laser light reflected by the recording medium into different optical paths according to planes of polarization;

first and second quadrant photodetectors, each with four light receiving regions, respectively disposed in the optical paths split by said polarized light beam splitter;

astigmatism generating means for generating astigmatisms in the light reflected by the recording medium and provided to said first and second quadrant photodetectors, said generated astigmatisms having directions which are coincident with each; and operation means for obtaining, for each quadrant photodetector, a differential output between a sum output from one pair of said regions where an intensity of received light is increased and a sum output from the other pair of said regions, with respect to one astigmatism, a sum of the differential output from each quadrant photodetector forming a focus error signal.

2. The apparatus for detecting a focus error signal according to claim 1, wherein said operation means comprises:

first addition means for forming, for each of said first and second quadrant photodetectors, a sum output from one pair of said regions where an intensity of received light is increased;

second addition means for forming, for each of said first and second quadrant photodetectors, a sum output from the other pair of said regions;

first subtraction means for forming a difference between outputs from said first and second addition means; and third addition means for forming a sum of the outputs from said respective subtraction means corresponding to said first and second photodetectors.

3. The apparatus for detecting a focus error signal according to claim 1, wherein said operation means comprises:

first addition means for forming, for each of said first and second quadrant photodetectors, a sum output from one pair of said regions where an intensity of received light is increased, of each of said first and second quadrant photodetectors;

second addition means for forming, for each of said first and second quadrant photodetectors, a sum output from the other pair of said regions, of each of said first and second quadrant detectors;

third addition means for forming a sum of the outputs from said first and second addition means; and first subtraction means for forming a differential output between outputs from said third addition means.

4. The apparatus for detecting a focus error signal according to claim 1, wherein said operation means includes at least one variable resistor means.

5. The apparatus for detecting a focus error signal according to claim 1, wherein said astigmatism generating means is disposed in an optical path of the laser light at a position before said polarized light beam splitter.

6. The apparatus for detecting a focus error signal according to claim 1, wherein said astigmatism generating means has a pair of elements which are disposed in the two optical paths split by said polarized light beam splitter, respectively.

7. The apparatus for detecting a focus error signal according to claim 1, wherein said astigmatism generating means comprises one of a cylindrical lens, a slanted plane-parallel plate and a shaped prism.

8. The apparatus for detecting a focus error signal according to claim 2, wherein said first addition means includes fourth and fifth addition means for adding together respective outputs from one pair of regions arranged in one diagonal direction, of one of said first and second quadrant photodetectors, said second addition means includes sixth and seventh addition means for adding together respective outputs from the other pair of regions, arranged in the direction perpendicular to said one diagonal direction, of one of said first and second quadrant photodetectors, and said first subtraction means includes a second substration means for forming a difference between the output from said fourth and sixth addition means and a third substraction means for forming a difference between the output from said fifth and seventh addition means.

9. The apparatus for detecting a focus error signal according to claim 3, wherein said first addition means includes fourth addition and fifth addition means for adding together respective outputs from one pair of regions, arranged in one diagonal direction, of one of said first and second quadrant photodetectors, said second addition means includes sixth and seventh addition means for adding together respective outputs from the other pair of regions, arranged in the direction perpendicular to said one diagonal direction, of one of said first and second quadrant photodetectors, and said third addition means includes eighth addition means for forming a sum of the outputs from said fourth and fifth addition means, and ninth addition means for forming a sum of the outputs from said sixth and seventh addition means.

10. The apparatus for detecting a focus error signal according to claim 1, wherein said operation means is operable for calculating a differential output between a sum output from two adjacent regions on one side of a dividing line for dividing a light receiving surface of one of said photodetectors and a sum output from two adjacent regions on the other side of the dividing line, thereby obtaining a tracking error signal, said dividing line coinciding with a track extending direction of the disk.

11. The apparatus for detecting a focus error signal according to claim 1, wherein said first and second quadrant photodetectors are operable for detecting a tracking error signal and for detecting a magnetooptic reproduction signal.

* * * * *